US007945179B2

(12) United States Patent
Kasai

(10) Patent No.: US 7,945,179 B2

(45) Date of Patent: May 17, 2011

(54) DRIVING METHOD FOR LIGHT-EMITTING ELEMENTS

(75) Inventor: Toshiyuki Kasai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 386 days.

(21) Appl. No.: 11/677,738

(22) Filed: Feb. 22, 2007

(65) Prior Publication Data

US 2007/0210997 A1 Sep. 13, 2007

(30) Foreign Application Priority Data

Mar. 7, 2006 (JP) ................................ 2006-060567

(51) Int. Cl.
*G03G 15/043* (2006.01)
*G09G 3/32* (2006.01)
*H04N 1/46* (2006.01)

(52) U.S. Cl. ............................ 399/51; 345/82; 358/505

(58) Field of Classification Search .................... 345/39, 345/48, 82; 358/1.9, 482, 505; 399/51
See application file for complete search history.

(56) References Cited

U.S. PATENT DOCUMENTS 5,600,363 A * 2/1997 Anzaki et al. ................ 347/237
6,442,361 B1 * 8/2002 Shiraishi et al. .............. 399/130
6,633,322 B2 * 10/2003 Sakai et al. .................. 347/233
2001/0017715 A1 * 8/2001 Nagumo et al. ............. 358/1.16
2004/0111030 A1 * 6/2004 Zeman ......................... 600/473

FOREIGN PATENT DOCUMENTS

JP A 11-235842 8/1999
JP A 2002-120391 4/2002
JP A 2003-25630 1/2003
JP A 2003-080763 3/2003

* cited by examiner

*Primary Examiner* — Benny Q Tieu
*Assistant Examiner* — Eric A Rust
(74) *Attorney, Agent, or Firm* — Oliff & Berridge PLC

(57) ABSTRACT

A light-emitting device includes: a plurality of light-emitting elements that emit light in response to driving signals; a control unit that adjusts the timings at which the driving signals are supplied to a plurality of blocks each composed of one or more light-emitting elements to generate control signals for indicating the timings at which the driving signals are supplied for every block; and a plurality of driving units that are provided for the blocks and supply the driving signals to the light-emitting elements belonging to the corresponding blocks on the basis of the control signals.

12 Claims, 11 Drawing Sheets

DRIVING METHOD FOR LIGHT-EMITTING ELEMENTS

BACKGROUND

1. Technical Field

The present invention relates to a light-emitting device using light-emitting elements, an electronic apparatus, and a driving method.

2. Related Art

Printers, serving as image forming apparatuses, use a light-emitting device including a plurality of light-emitting elements arranged in an array as a head unit for forming an electrostatic latent image on an image carrier, such as a photorecepter drum. In general, such a head unit has a plurality of light-emitting elements arranged in a line along the main scanning direction. In addition, a light-emitting diode, such as an organic light-emitting diode (hereinafter, referred to as an OLED), has been used as the light-emitting element.

The head unit has light-emitting elements, a driving current source that is provided in the vicinities of the light-emitting elements and supplies driving currents to the light-emitting elements, and a driving circuit that generates a driving signal for controlling the supply of the driving current formed on a substrate. In the line head, when all the light-emitting elements emit light to form a latent image, the driving currents corresponding to the number of light-emitting elements flow at the same time, which causes current consumption to instantaneously increase. When a large amount of current flows instantaneously, a voltage to be applied to the head varies, which may cause an erroneous operation of the head. Therefore, in the line head, it is important to reduce the amount of current instantaneously flowing in order to stably operate the head. In order to achieve this object, the following technique has been proposed: in a light-emitting element array in which a plurality of light-emitting elements are classified into a plurality of blocks and the light-emitting elements belonging to each of the blocks are arranged such that the light-emitting elements are displaced in one of two directions (parallel to a sub-scanning direction) orthogonal to the direction in which the light-emitting elements are arranged, the directions in which adjacent blocks among the plurality of blocks are displaced are opposite to each other (JP-A-2003-80763). In this way, the emission of light alternately occurs in adjacent blocks, which makes it possible to temporally disperse the driving current. As a result, instantaneous current consumption is reduced, which makes it possible to prevent power noise and thus to stably operate the head.

In the related art, light-emitting elements have been arranged in a line, but in the technique disclosed in JP-A-2003-80763, the light-emitting elements are arranged in a plurality of lines, which causes the length of the head unit to increase in the sub-scanning direction. As a result, the structure of the line head becomes complicated, and thus the manufacturing cost and the size of the line head increase. In order to solve these problems, it is preferable to reduce the number of rows of light-emitting elements to two. However, when the number of rows of light-emitting elements decreases, the number of light-emitting elements emitting light at the same time increases, which causes a large amount of current to flow instantaneously, resulting in an increase in noise. That is, the number of rows of light-emitting elements is inversely proportional to the amount of noise generated. In the technique disclosed in JP-A-2003-80763, it is necessary to predetermine the number of rows of light-emitting elements, which makes it difficult to manage when slight variation in the arrangement of the light-emitting elements occurs.

In general, it is difficult to predetermine the amount of the instantaneous current required to accurately operate the head (to reduce the amount of noise). Therefore, in many cases, a printing test is performed by actually using a finished head to allow an appropriate measure to reduce noise to be taken. In the technique disclosed in JP-A-2003-80763, if the number of rows of light-emitting elements is increased due to an insufficient measure to reduce noise, a new head unit needs to be manufactured. Therefore, it is necessary to manufacture a head having a small amount of noise, that is, a large number of rows of light-emitting elements in order to reliably operate the head. However, as described above, having a large number of rows of light-emitting elements causes an increase in the manufacturing cost and the size of the head. Therefore, it is difficult to realize a low manufacturing cost, a small size, and a stable operation for the head according to the related art.

SUMMARY

An advantage of some aspects of the invention is that it provides a light-emitting device that has a small size, includes light-emitting elements having a simple structure, and is stably operated, an electronic apparatus, and a driving method.

According to an aspect of the invention, a light-emitting device includes: a plurality of light-emitting elements that emit light in response to driving signals; a control unit that adjusts the timings at which the driving signals are supplied to a plurality of blocks each composed of one or more light-emitting elements to generate control signals for indicating the timings at which the driving signals are supplied for every block; and a plurality of driving units that are provided for the blocks and supply the driving signals to the light-emitting elements belonging to the corresponding blocks on the basis of the control signals.

According to the above-mentioned structure, the timings at which the driving signals are supplied are set for every block, and the timings at which the driving signals are supplied may be set to a plurality of blocks. When all the blocks simultaneously supply the driving signals, a large amount of current flows, which causes a large amount of noise to occur in a power line. However, according to the above-mentioned structure, the driving signals can be supplied at different timings, which makes it possible to temporally disperse noise. In addition, the timings at which the driving signals are supplied to each of the blocks can be adjusted. Therefore, when the light-emitting device is used as an optical head, it is possible to adjust the timings at which the driving signals are supplied to balance a printing quality without generating an erroneous operation due to noise.

In the light-emitting device according to the above-mentioned aspect, preferably, the control unit classifies the blocks into a plurality of groups each supplying the driving signals at the same timing, generates the control signals to be supplied to the plurality of groups at different timings, and regroups the blocks in response to a setting signal (for example, setting data Q in the following embodiment). In general, the amount of noise depends on the number of blocks emitting light at the same time. However, according to the above-mentioned structure, the blocks can be regrouped according to the setting signal, which makes it possible to change the number of blocks belonging to each group according to a noise margin.

According to the above-mentioned aspect, preferably, the light-emitting device further includes a storage unit that stores the setting signal. In this case, preferably, the control unit reads out the setting signal from the storage unit to regroup the blocks. According to the above-mentioned structure, it is possible to evaluate an erroneous operation of the light-emitting device due to noise before the shipment of the light-emitting device and store the setting signal in the storage unit such that optimum printing quality is obtained without generating an erroneous operation.

In the light-emitting device according to the above-mentioned aspect, preferably, the setting signal designates a printing quality. In addition, preferably, the control unit regroups the blocks such that the number of blocks belonging to each of the groups increases as the printing quality designated by the setting signal increases thereby reducing the number of groups. When the obtained printing quality is high, it is preferable that the maximum step difference in printing be small. The smaller the number of groups becomes, the smaller the maximum step difference becomes in printing. According to the above-mentioned structure, it is possible to change the number of groups according to the printing quality. Therefore, it is possible to decrease the number of groups to reduce the step difference, when high printing quality is needed. On the other hand, it is possible to increase the number of groups to reduce the amount of noise, when high printing quality is not needed.

More specifically, when a high-speed printing mode (low-quality printing mode) is set, the number of groups increases to reduce the amount of noise and to increase the maximum step difference (increase a skew amount). On the other hand, when a low-speed printing mode (high-quality printing mode) is set, the number of groups decreases to reduce the amount of noise and to reduce the maximum step difference (reduce a skew amount).

In the light-emitting device according to the above-mentioned aspect, preferably, the control unit includes: a reference signal generating unit that generates a reference signal; and a control signal generating unit that detects the reference signal to start counting a clock signal and generates the control signals according to the counting result. In this case, the control signal generating unit may be provided for every block, or it may be provided for every group so that it may be a common unit to a plurality of blocks belonging to the group.

In the light-emitting device according to the above-mentioned aspect, preferably, the control unit assigns the blocks to the plurality of groups such that the relative delay and advance of the timings at which the driving signals are supplied to adjacent groups are repeated in a predetermined cycle. When the timings at which the driving signals are supplied set in this way, it is possible to reduce the amplitude of a wave during printing.

In the light-emitting device according to the above-mentioned aspect, preferably, the control unit assigns the blocks to the plurality of groups such that a deviation between the times to supply the driving signals to adjacent groups is constant. In this case, it is possible to equally distribute the step difference in printing. As a result, the step difference becomes large at one point so that the viewer cannot see the step difference.

According to another aspect of the invention, an electronic apparatus includes the light-emitting device according to the above-mentioned aspect. Any of the following apparatuses can be used as the electronic apparatus: a printer, a copy machine, a facsimile, a display apparatus for display images, a personal computer, and a mobile phone.

According to still another aspect of the invention, there is provided a method of driving a plurality of light-emitting elements in response to driving signals. The driving method includes: adjusting the timings at which the driving signals are supplied to a plurality of blocks each composed of one or more light-emitting elements to generate control signals for indicating the timings at which the driving signals are provided for every block; and supplying the driving signals to the light-emitting elements belonging to the corresponding blocks on the basis of the control signals generated for every block. According to the above-mentioned driving method, the driving signals can be supplied at different timings, which makes it possible to temporarily disperse noise. In addition, the timings at which the driving signals are supplied to each of the blocks can be adjusted. Therefore, when the light-emitting device is used as an optical head, it is possible to adjust the timings at which the driving signals are supplied to balance a printing quality without generating an erroneous operation due to noise.

In the driving method according to the above-mentioned aspect, preferably, the generating of the control signals includes: classifying the blocks into a plurality of groups each supplying the driving signals at the same timing; generating the control signals to be supplied to the plurality of groups at different timings; and regrouping the blocks according to a predetermined setting condition. According to the above-mentioned driving method, the blocks can be regrouped according to the setting condition, which makes it possible to change the number of blocks belonging to each group according to a noise margin.

In the driving method according to the above-mentioned aspect, preferably, the predetermined setting condition designates a printing quality. In addition, preferably, the generating of the control signals includes: regrouping the blocks such that the number of blocks belonging to each of the groups increases as the printing quality designated by the predetermined setting condition increases, thereby reducing the number of groups. In the above-mentioned driving method, when a high-quality printing mode is set, the number of groups can decrease to reduce the maximum step difference in printing. On the other hand, when a low-quality printing mode is set, the number of groups can be increased to increase the maximum step difference in printing.

The light-emitting element may be, for example, a light emitting diode, such as an organic light emitting diode or an inorganic light emitting diode. Examples of the light-emitting device include a field emission display (FED), a surface-conduction electro-emitter display (SED), and a ballistic electron surface emitting display (BSD).

BRIEF DESCRIPTION OF THE DRAWINGS

The invention will be described with reference to the accompanying drawings, wherein like numbers refer like elements.

DESCRIPTION OF EXEMPLARY EMBODIMENTS

Figure 1:
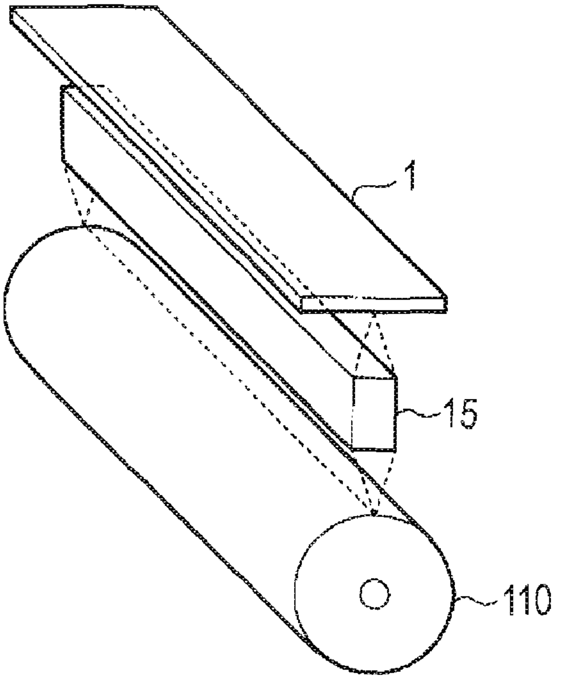
FIG. 1 is a perspective view illustrating the structure of a portion of an image forming apparatus using an optical head according to an embodiment of the invention.

Hereinafter, exemplary embodiments of the invention will be described with reference to the accompanying drawings. In the drawings, components having the same functions are denoted by the same reference numerals.

First Embodiment

FIG. 1 is a perspective view illustrating the structure of a portion of an image forming apparatus using an optical head according to a first embodiment of the invention. As shown in FIG. 1, the image forming apparatus includes an optical head 1, an optical fiber lens array 15, and a photorecepter drum 110. The optical head 1 includes a plurality of light-emitting elements arranged in an array. These light-emitting elements selectively emit light in accordance with an image to be printed on a recording medium, such as a sheet. For example, organic light emitting diodes (hereinafter, referred to as OLEDs) are used as the light-emitting elements. The optical fiber lens array 15 is disposed between the optical head 1 and the photorecepter drum 110. The optical fiber lens array 15 includes a plurality of gradient index lens that are arranged in an array and are urged such that the optical axes thereof are perpendicular to the optical head 1. Light emitted from each of the light-emitting elements of the optical head 1 passes through the corresponding gradient index lens of the optical fiber lens array 15 to reach the surface of the photoreceptor drum 110. The light causes a latent image corresponding to a desired image to be formed on the surface of the photorecepter drum 110.

Figure 2:
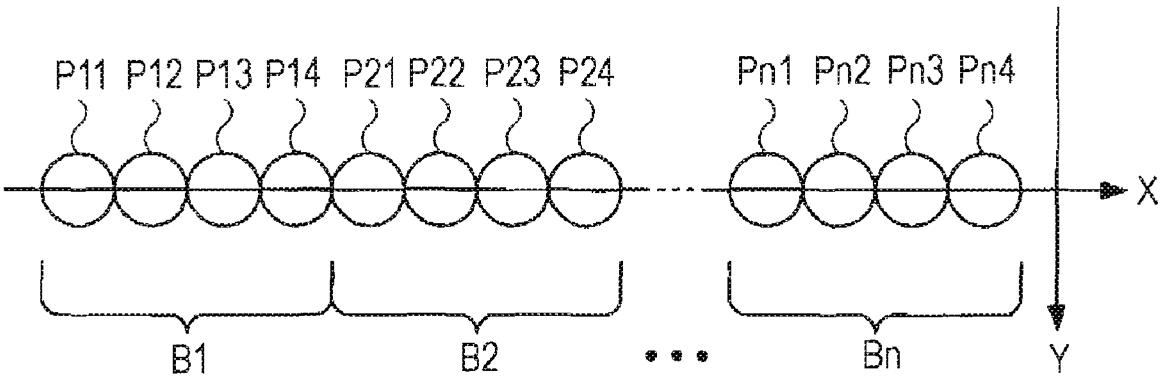
FIG. 2 is a plan view illustrating the arrangement of OLEDs used in an optical head 1 according to a first embodiment of the invention.

FIG. 2 is a plan view illustrating the arrangement of the OLEDs used in the optical head 1 according to the first embodiment. As shown in FIG. 2, a plurality of OLEDs are divided into n blocks B1 to Bn each having four OLEDs. For example, the block B1 includes four OLEDs P11, P12, P13, and P14. The OLEDs P11, P12, . . . , Pn4 are arranged in a line in a main scanning direction X. The main scanning direction X is aligned with a printing line direction, and a sub-scanning direction Y orthogonal to the main scanning direction X is a scanning direction for the photorecepter drum 110. In the following description, when the blocks and the OLEDs do not need to be individually specified, the blocks and the OLEDs are simply represented by characters 'B' and 'P', respectively.

Figure 3:
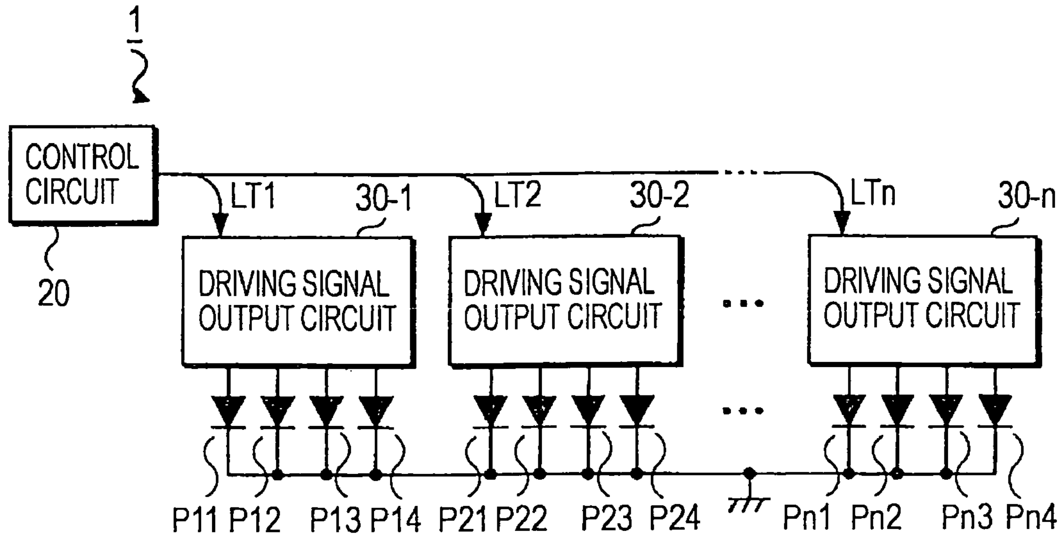
FIG. 3 is a block diagram illustrating the structure of the optical head 1.

FIG. 3 is a block diagram illustrating the structure of the optical head 1. As shown in FIG. 3, the optical head 1 includes a control circuit 20, n driving signal output circuits 30, and 4n OLEDs P11 to Pn4. The driving signal output circuits 30-1 to **30-*n* are provided so as to correspond to the blocks B1 to Bn, and are supplied with control signals LT1 to LTn from the control circuit 20, respectively. The control signals LT1 to LTn specify the timing at which driving currents (driving signals) are supplied to the OLEDs P11 to Pn4 belonging to the blocks B1 to Bn. The driving signal output circuits 30-1 to 30-*n* supply the driving currents (driving signals) to the OLEDs P11 to Pn4 in response to the control signals LT1** to LTn, respectively.

Figure 4:
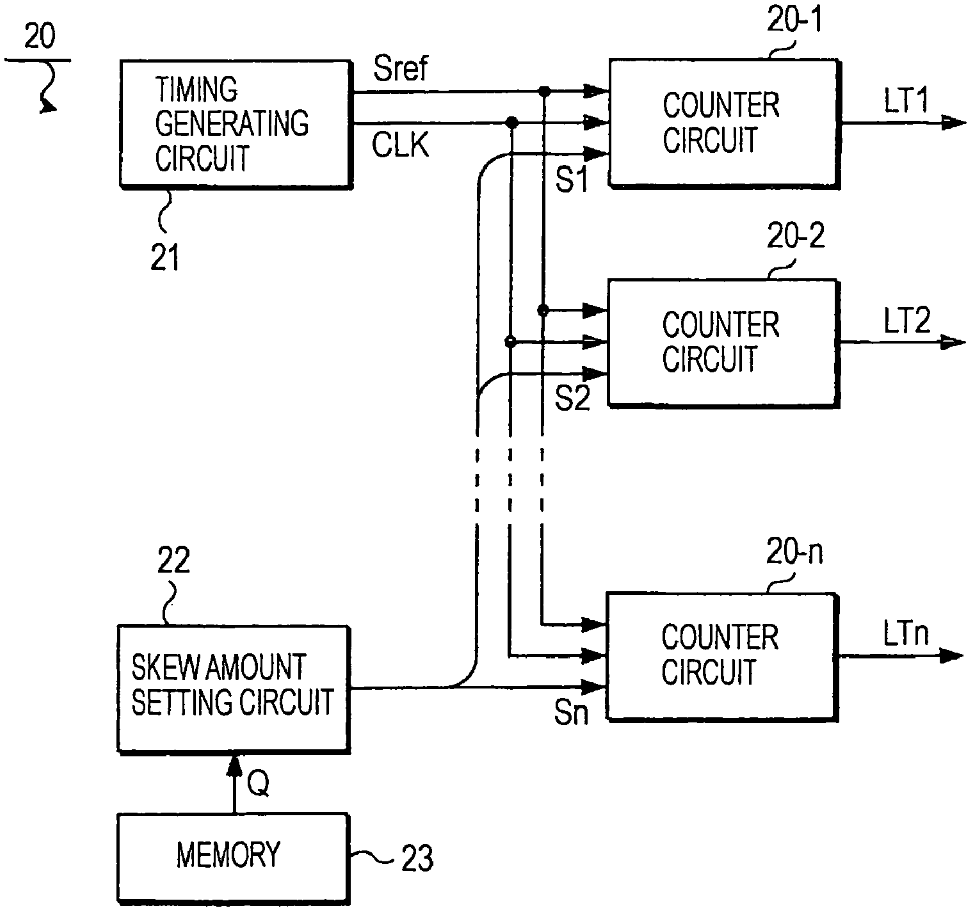
FIG. 4 is a block diagram illustrating the structure of a control circuit 20.

FIG. 4 is a block diagram illustrating the structure of the control circuit 20. As shown in FIG. 4, the control circuit 20 includes n counter circuits 20-1 to **20-*n* that are provided so as to correspond to the blocks B1 to Bn, a timing generating circuit 21, a skew amount setting circuit 22, and a memory 23. The timing generating circuit 21 generates a reference signal Sref and a clock signal CLK. The reference signal Sref controls the count start timing of the counter circuits 20-1 to 20-*n*. The clock signal CLK is a basic clock for defining the operational timing of the counter circuits 20-1 to 20-*n***.

The counter circuits 20-1 to **20-*n* have a unction of counting the clock signal CLK for a predetermined number of periods and changing the control signals LT1 to LTn from a low level to a high level. When the reference signal Sref changes to a high level, the counter circuits 20-1 to 20-*n* start counting the clock signal CLK, and when the count value is equal to a value specified by skew amount setting signals S1 to Sn, the counter circuits 20-1 to 20-*n* set the control signals LT1 to LTn to high levels. The control signals LT1 to LTn are supplied to the driving signal output circuits 30-1 to 30-*n* in the next stage to designate the timing at which the driving current is started to be supplied to the OLEDs P11, P12, . . . , Pn4 included in the blocks B1 to Bn. Therefore, it is possible to control the timing at which the driving current is started to be supplied to each of the blocks B1 to Bn by appropriately setting the skew amount setting signals S1 to Sn. For example, when the value of the skew amount setting signal S2 is set to be larger than the value of the skew amount setting signal S1, it is possible to delay the start of the supply of the driving current (the time when the OLEDs start emitting light) to the block B2 by more than that of the block B1. In contrast, when the value of the skew amount setting signal S1 is set to be larger than the value of the skew amount setting signal S2, the time when the OLEDs in the block B2 start emitting light can be earlier than the time when the OLEDs in the block B1 start emitting light. That is, the skew amount setting signals S1** to Sn make it possible to control the time when the OLEDs in each of the blocks start emitting light.

The skew amount setting circuit 22 reads out setting data Q (value for setting the time when the OLEDs start emitting light) from the memory 23 and generates the skew amount setting signals S1 to Sn on the basis of the setting data Q. The memory 23 is a volatile or non-volatile storage unit. In this embodiment, since it is possible to designate the timing at which the driving current is supplied to each of the blocks B1 to Bn, it is possible to appropriately set the number of blocks (the number of OLEDs) emitting light at the same time. For example, when an even-numbered block has the setting data Q of 1 and an odd-numbered block has the setting data Q of 2, a timing difference (skew) corresponding to the period of a clock signal CLK1 occurs between the even-numbered block and the odd-numbered block. Even under the conditions that all of the light-emitting elements emit light, the number of light-emitting elements emitting light at the same time is half the total number of light-emitting elements. Therefore, an impulse current is reduced to about half the overall current, and noise is also reduced. When different setting data Q is set to the blocks including a smaller number of light-emitting elements, the number of light-emitting elements emitting light at the same time is reduced, which makes it possible to considerably reduce noise.

This function makes it possible to actually evaluate the relationship between the value of the setting data Q and the stability of operation and to determine the optimal value of the setting data Q, after the optical head 1 is manufactured. When the optimal value of the setting data Q is stored in the memory 23, the optimal value of the setting data Q can always be applied during printing. When the number of blocks emitting light at the same time decreases, noise is reduced, so that the image forming apparatus can be stably operated. However, when the number of blocks emitting light at the same time decreases, the timing at which a large number of blocks emit light deviate from each other, and a step difference occurs at many points when the latent image of a straight line is formed. Since the step difference is not desirable in printing, it is preferable to increase the number of blocks emitting light at the same time as much as possible to reduce the step difference in order to improve the quality of printing. The technique of this embodiment makes it possible to calculate the optimum setting data Q capable of obtaining both a stable operation and a high printing quality after evaluating the optical head 1.

Next, examples (first to fourth patterns) of the actual control of the light-emitting timing will be described below.

Figure 6:
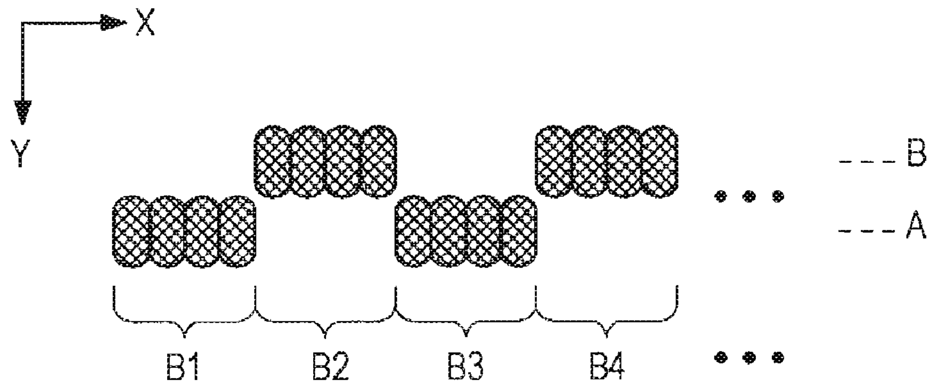
FIG. 6 is a diagram illustrating a latent image formed on a photorecepter in the first pattern.

First, the first pattern will be described. As shown in FIG. 6, in the first pattern, the timings at which adjacent blocks emit light deviate from each other. For example, when the odd-numbered blocks B1, B3, . . . , B2*n*−1 (where n is a natural number) belong to a group A and the even-numbered blocks B2, B4, . . . , B2*n* belong to a group B, a difference between the timing at which the driving current is supplied to the group A and the timing at which the driving current is supplied to the group B is provided (FIG. 6 shows the latent image formed by the photorecepter drum 110).

Figure 5:
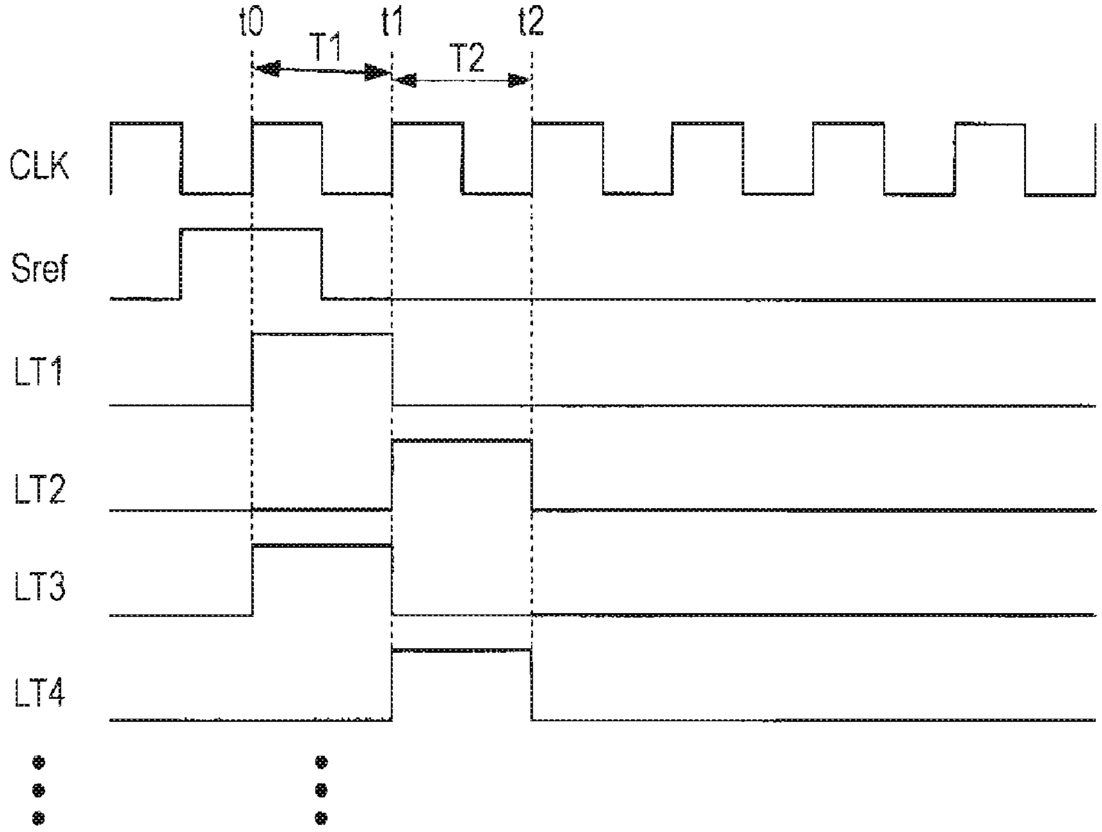
FIG. 5 is a timing chart illustrating the operation of the control circuit in a first pattern.

FIG. 5 is a timing chart of the control circuit 20 when the setting data Q designates the first pattern. In the first pattern, the skew amount setting unit 22 sets the designated values of odd-numbered skew amount setting signals S1, S3, . . . , S2*n*−1 corresponding to the group A to '0', and sets the designated values of even-numbered skew amount setting signals S2, S4, . . . , S2*n* corresponding to the group B to '1'. In this case, in a first period T1 from a time t0 to a time t1, the odd-numbered control signals LT1, LT3, . . . , LT2*n*−1 are activated. In a second period T2 from the time t1 to a time t2, the even-numbered control signals LT2, LT4, . . . , LT2*n* are activated. This control makes it possible to realize the latent image shown in FIG. 6. In the first pattern, since the number of blocks emitting light at the same time in the groups A and B is half the total number of blocks, the impulse current knowing when the blocks emit light is reduced to about half the current when all the blocks emit light. In addition, the maximum step difference when the latent image of a straight line is formed is equal to the distance between the groups A and B in FIG. 6, and the distance corresponds to the deviation between the times when the blocks included in the groups emit light. The magnitude of the deviation between the times when the blocks included in the groups emit light is not directly related to the impulse current when light is emitted, but the number of blocks emitting light at the same time (the total number of OLEDs) is directly related to the impulse current when light is emitted. Therefore, when the deviation between the times when the blocks emit light is set to a small value, it is possible to reduce the maximum step difference when the latent image of a straight line is formed and thus prevent a considerable reduction in printing quality.

Figure 8:
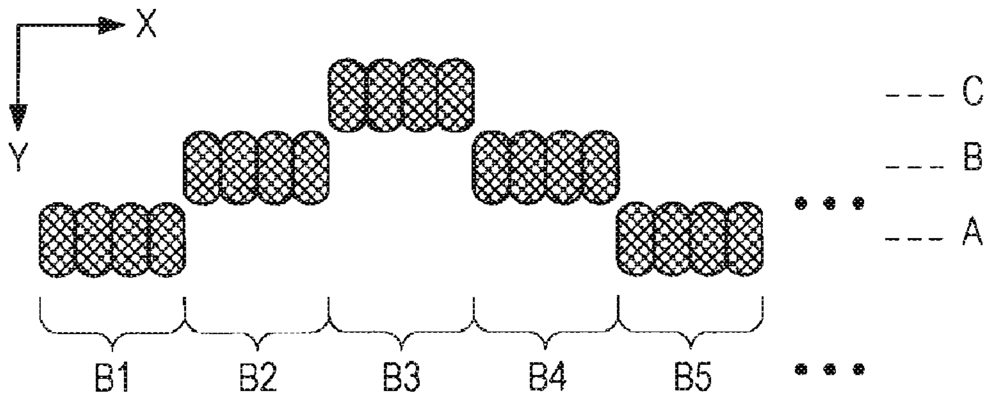
FIG. 8 is a diagram illustrating a latent image formed on a photoreceptor in the second pattern.

Next, the second pattern will be described below. In the second pattern, as shown in FIG. 8, the times when the blocks emit light deviate from each other in a four-block cycle having a wave shape. For example, when the blocks B1, B5, B9, . . . , B4*n*−3 (where n is a natural number) belong to a group A, the blocks B2, B4, B6, . . . , B2*n* belong to a group B, and the groups B3, B7, B11, . . . , B4*n*−1 belong to a group C, a difference among the timings at which the driving current is supplied to the groups A, B, and C is provided.

Figure 7:
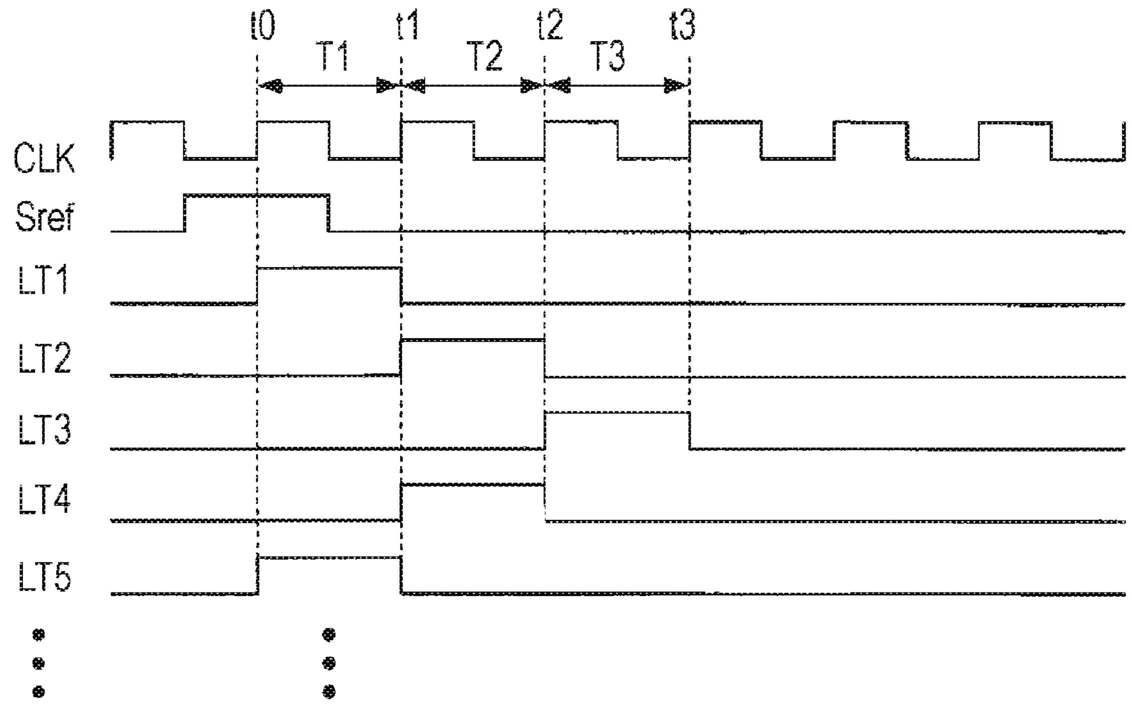
FIG. 7 is a timing chart illustrating the operation of the control circuit in a second pattern.

FIG. 7 is a timing chart of the control circuit 20 when the setting data Q designates the second pattern. In the second pattern, the skew amount setting unit 22 sets the designated values of the skew amount setting signals S1, S5, S9, . . . , S4*n*−3 corresponding to the group A to '0', the designated values of the skew amount setting signals S2, S4, S6, . . . , S2*n* corresponding to the group B to '1', and the designated values of the skew amount setting signals S3, S7, S11, . . . , S4*n*−1 to '2'. In this case, in a first period T1 from a time t0 to a time t1, the control signals LT1, LT5, . . . , LT4*n*−3 are activated. In a second period T2 from the time t1 to a time t2, the control signals LT2, LT4, . . . , LT2*n* are activated. In a third period T3 from the time t2 to a time t3, the control signals LT3, LT7, . . . , LT4*n*−1 are activated. This control makes it possible to realize the latent image shown in FIG. 8. In the second pattern, the number of blocks emitting light at the same time is different in each group. That is, the number of blocks emitting light at the same time in the group A is a quarter of the total number of blocks, the number of blocks emitting light at the same time in the group B is half the total number of blocks, and the number of blocks emitting light at the same time in the group C is a quarter of the total number of blocks. In addition, the maximum step difference when the latent image of a straight line is formed is the distance from the group A to the group C in FIG. 8.

Figure 10:
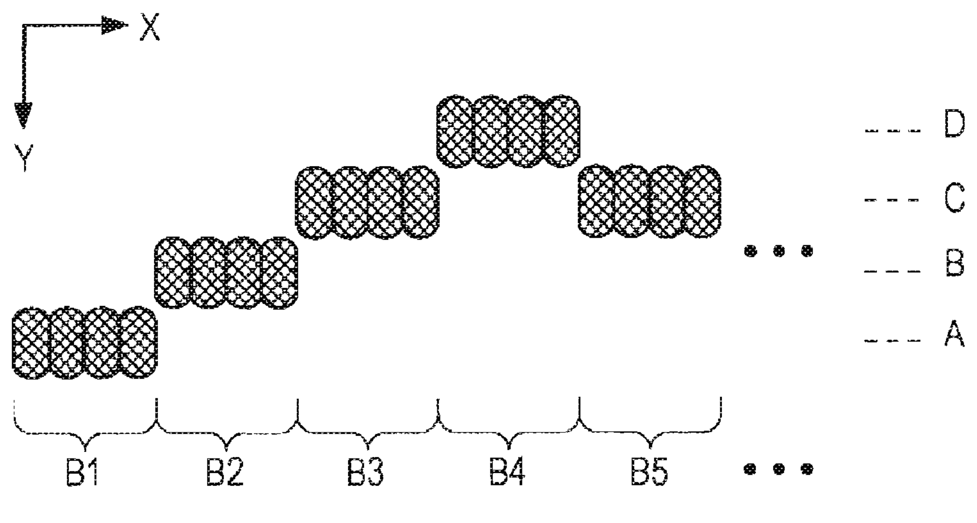
FIG. 10 is a diagram illustrating a latent image formed on a photorecepter in the third pattern.

Next, the third pattern will be described below. In the third pattern, as shown in FIG. 10, the times when the blocks emit light deviate from each other in a six-block cycle having a wave shape. For example, when the blocks B1, B7, B13, . . . , B6*n*−5 (where n is a natural number, belong to a group A, the blocks B2, B6, . . . , B4*n*−2 belong to a group B, the groups B3, B5, B7, . . . , B2*n*+1 belong to a group C, and the groups B4, B10, . . . , B6*n*−2 belong to a group D, a difference among the timings at which the driving current is supplied to the groups A to D is provided.

Figure 9:
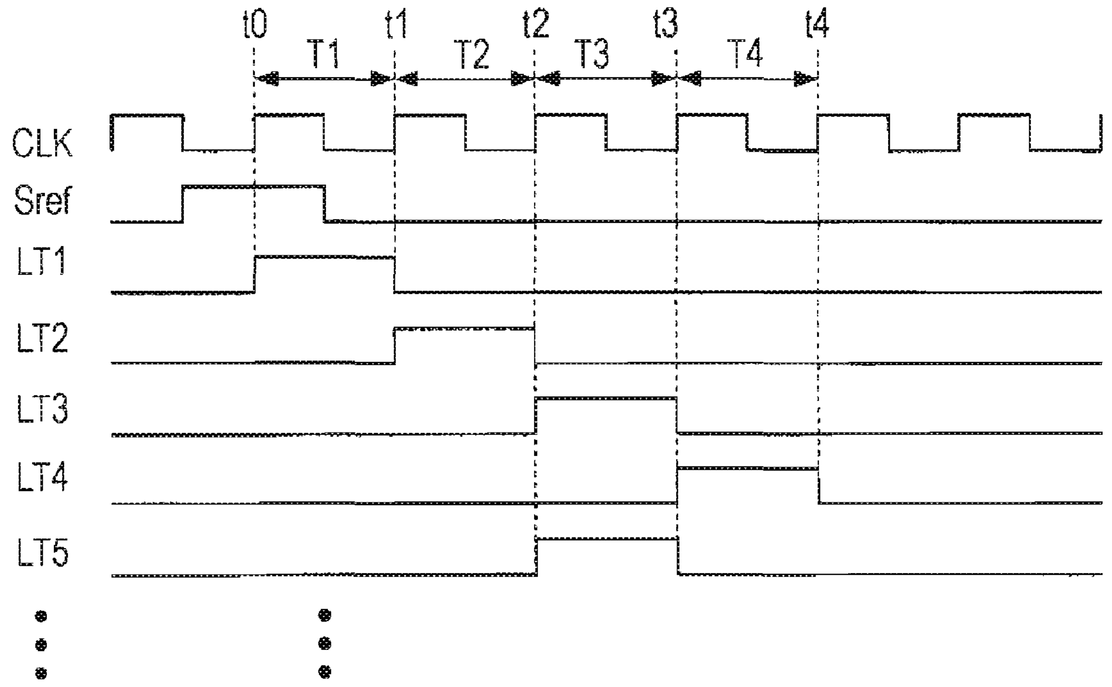
FIG. 9 is a timing chart illustrating the operation of the control circuit in a third pattern.

FIG. 9 is a timing chart of the control circuit 20 when the setting data Q designates the third pattern. In the third pattern, the skew amount setting unit 22 sets the designated values of the skew amount setting signals S1, S7, S13, . . . , S6*n*−5 corresponding to the group A to '0', the designated values of the skew amount setting signals S2, S6, . . . , S4*n*−2 corresponding to the group B to '1', the designated values of the skew amount setting signals S3, S5, S7, . . . , S2*n*+1 corresponding to the group C to '2', and the designated values of the skew amount setting signals Q4, S10, . . . , S6*n*−2 corresponding to the group D to '3'. In this case, in a first period T1 from a time t0 to a time t1, the control signals LT1, LT7, . . . , LT6*n*−5 are activated. In a second period T2 from the time t1 to a time t2, the control signals LT2, LT6, . . . , LT4*n*−2 are activated. In a third period T3 from the time t2 to a time t3, the control signals LT3, LT5, . . . , LT2*n*+1 are activated. In a fourth period T4 from the time t3 to a time t4, the control signals LT4, LT10, . . . , LTn−2 are activated. This control makes it possible to realize the latent image shown in FIG. 10. In the third pattern, the number of blocks emitting light at the same time is different in each group. That is, the number of blocks emitting light at the same time in the group A is one-sixth of the total number of blocks, the number of blocks emitting light at the same time in the group B is one-third of the total number of blocks, the number of blocks emitting light at the same time in the group C is one-third of the total number of blocks, and the number of blocks emitting light at the same time in the group D is one-sixth of the total number of blocks. In addition, the maximum step difference when the latent image of a straight line is formed is the distance from the group A to the group D in FIG. 10.

Figure 11:
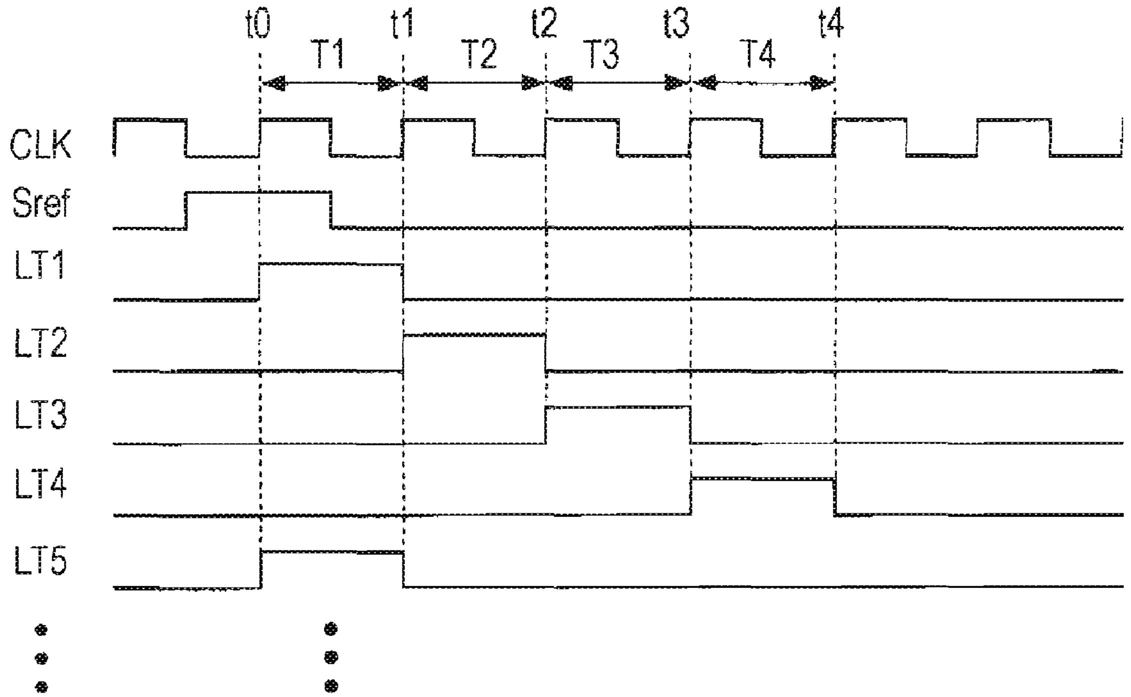
FIG. 11 is a timing chart illustrating another example of the operation of the control circuit in the third pattern.
Figure 12:
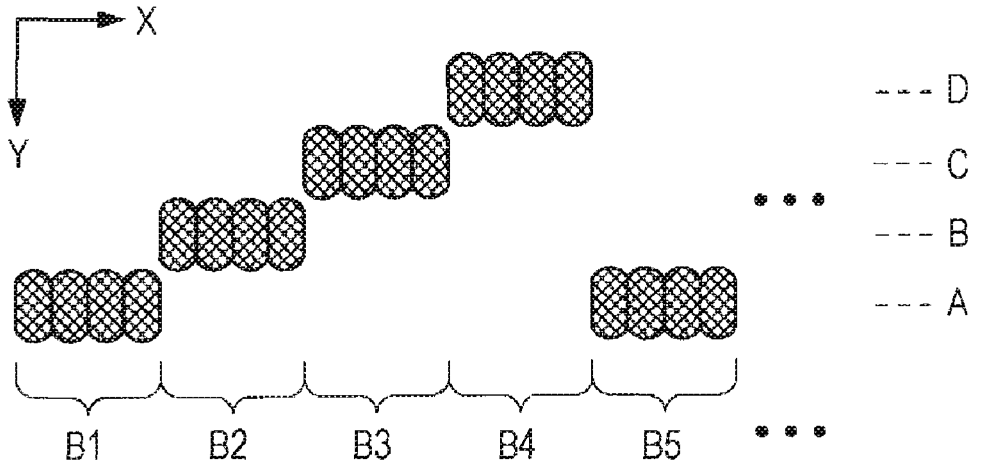
FIG. 12 is a diagram illustrating another example of the latent image formed on the photorecepter in the third pattern.

Next, the fourth pattern will be described below. In the fourth pattern, as shown in FIG. 12, the times when the blocks emit light deviate from each other in a four-block cycle having a saw-toothed shape. For example, when the blocks B1, B5, B9, . . . , B4*n*−3 (where n is a natural number) belong to a group A, the blocks B2, B6, . . . , B4*n*−2 belong to a group B, the groups B3, B7, B11, . . . , B4*n*−1 belong to a group C, and the groups B4, B8, . . . , B4*n* belong to a group D, a difference among the timings at which the driving current is supplied to the groups A to D is provided. FIG. 11 is a timing chart of the control circuit 20 in the above-mentioned case. In the fourth pattern, the skew amount setting unit 22 sets the designated values of the skew amount setting signals S1, S6, S9, . . . , S4*n*−3 corresponding to the group A to '0', the designated values of the skew amount setting signals S2, S6, . . . , S4*n*−2 corresponding to the group B to '1', the designated values of the skew amount setting signals S3, S7, S11, . . . , S4*n*−1 corresponding to the group C to '2', and the designated values of the skew amount setting signals S4, S8, . . . , S4*n* corresponding to the group D to '3'. In this case, in a first period T1 from a time t0 to a time t1, the control signals LT1, LT5, . . . , LT4*n*−3 are activated. In a second period T2 from the time t1 to a time t2, the control signals LT2, LT6, . . . , LT4*n*2 are activated. In a third period T3 from the time t2 to a time t3, the control signals LT3, LT7, . . . , LT4*n*−1 are activated. In a fourth period T4 from the time t3 to a time t4, the control signals LT4, LT8, . . . , LT4*n* are activated. By controlling the signals, it is possible to realize the latent image shown FIG. 12. In the fourth pattern, the number of blocks emitting light at the same time in each of the groups A, B, C, and D is a quarter of the total number of blocks, and thus the impulse current flowing when light is emitted is reduce to about a quarter of the overall current. In addition, the maximum step difference when the latent image of a straight line is formed is the distance from the group A to the group D in FIG. 12.

In this embodiment, the control circuit 20 adjusts the timing at which the driving current is supplied to the OLEDs P11 to Pn4 in a plurality of blocks B1 to Bn, on the basis of the skew amount setting signals S1 to Sn, to generate the control signals LT1 to LTn indicating the timing at which the driving current is supplied to the blocks B1 to Bn. In this way, it is possible to change the number of blocks emitting light at the same time (the total number of OLEDs) and thus to adjust the period in which noise caused by the supply of the driving current is generated. In addition, as in the first to fourth patterns, it is possible to form various timing patterns and store the patterns in the memory 23 as the setting data Q. It is possible to change the setting data Q to change the timing patterns. Therefore, it is possible to calculate the optimum setting data Q capable of obtaining both a stable operation and a high printing quality after evaluating the optical head 1.

In general, as the operating speed of an electric circuit including the optical head 1 increases, a larger amount of noise is generated. Therefore, when printing is performed at a high speed, it is expected that a larger amount of noise will be generated than when printing is performed at a low speed. In this embodiment, the number of blocks emitting light at the same time is decreased in order to reduce the noise. In this case, the maximum step difference occurs when the latent image of a straight line is formed. However, actually, it does not matter if printing quality is reduced, as long as the printing speed is high. Therefore, a printing mode in which a low-quality image is printed at high speed is available. In contrast, a printing mode in which a high-quality image is printed at low speed can be provided. Printers having a plurality of printing modes capable of printing images at different printing speeds and with different printing qualities have been proposed.

As described above, in order to apply this embodiment to a printer having a plurality of printing modes, it is preferable to prepare a plurality of setting data Q corresponding to the plurality of printing modes beforehand. For example, the setting data Q1 is prepared for the printing mode in which a low-quality image is printed at high speed, and the setting data Q2 is prepared for the printing mode in which a high-quality image is printed at low speed. Then, the fourth pattern shown in FIG. 12 in which the number of blocks emitting light at the same time is decreased is selected as the setting data Q1, and the first pattern shown in FIG. 6 in which the number of blocks emitting light at the same time is increased is selected as the setting data Q2. In this state, when the printing mode in which a low-quality image is printed at high speed is set, the setting data Q1 is supplied to the skew amount setting unit 22 to realize the fourth pattern. When the printing mode in which a high-quality image is printed at low speed is set, the setting data Q2 is supplied to the skew amount setting unit 22 to realize the first pattern.

Second Embodiment

In the optical head 1 according to the first embodiment, the counter circuits 20-1 to 20-*n* respectively corresponding to the blocks B1 to Bn are provided. In contrast, an optical head 1 according to a second embodiment differs from the optical head 1 according to the first embodiment in that counter circuits are also used as a plurality of blocks.

Figure 13:
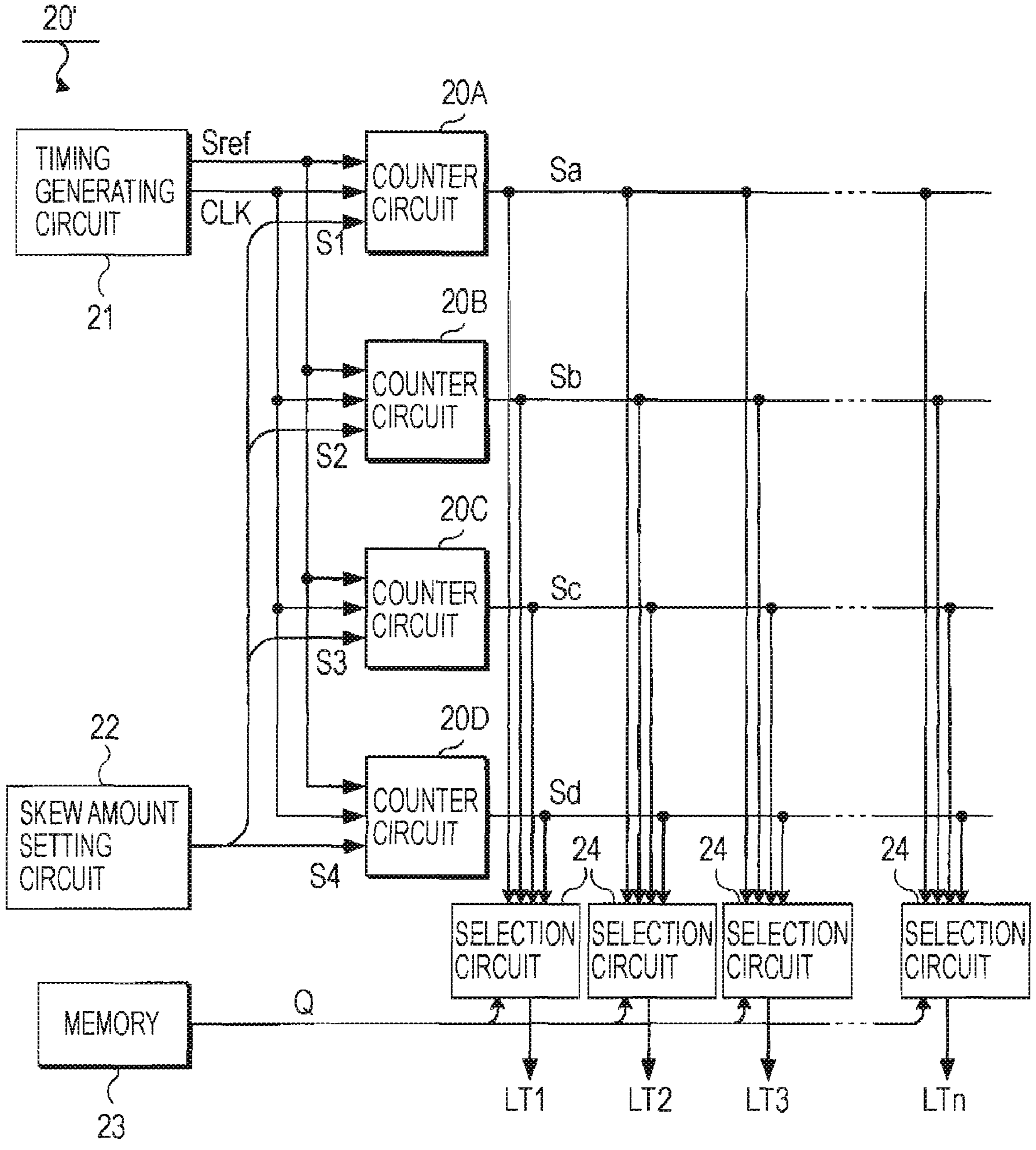
FIG. 13 is a block diagram illustrating the structure of a control circuit 20' used in a second embodiment.

FIG. 13 is a diagram illustrating a control circuit 20' according to the second embodiment. The control circuit 20' includes a counter circuit 20A for a group A, a counter circuit 20B for a group B, a counter circuit 20C for a group C, and a counter circuit 20D for a group D. Selection circuits 24 select signals output from the counter circuits 20A to 20D on the basis of a selection signal SEL to generate control signals LT1 to LTn.

As described above, the blocks B1 to Bn are classified into groups having the same supply timing of the driving current. Therefore, the control signals are activated at the same time in the same group. Thus, in this embodiment, the counter circuits are also used as the blocks, which makes it possible to simplify the structure of the control circuit.

In the first and second embodiments, the setting data Q is stored in the memory 3, but the invention is not limited thereto. For example, a designation signal (not shown) for designating a printing mode may be received from a host apparatus, and the received designation signal may be supplied to the skew amount setting circuit 22 or the selection circuits 24.

In the above-described first and second embodiments, four OLEDs are included in each of the blocks B1 to Bn, but the number of OLEDs P is not limited thereto. For example, the number of OLEDs may be different in each block. In addition, the number of OLEDs included in each block is preferably equal to or larger than 1.

Third Embodiment

Figure 14:
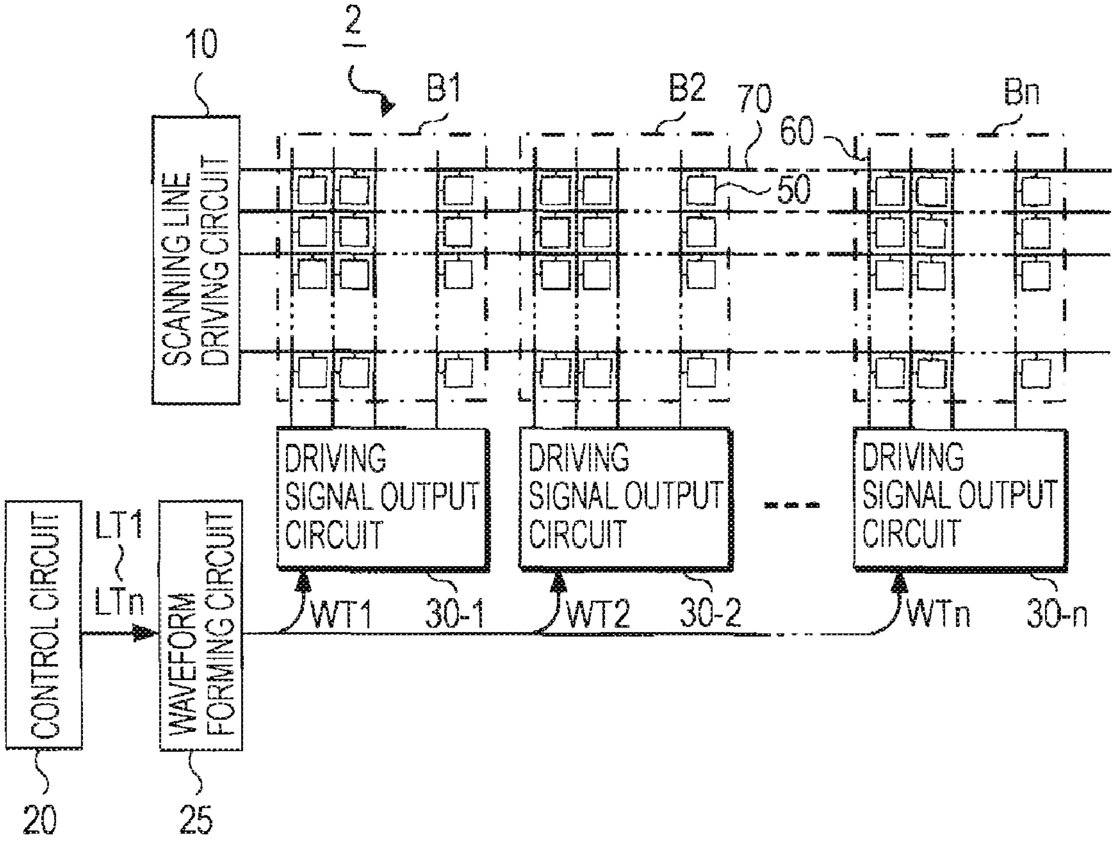
FIG. 14 is a block diagram illustrating the structure of a light-emitting device 2 according to a third embodiment.

FIG. 14 is a block diagram illustrating the structure of a light-emitting device 2 according to a third embodiment. The light-emitting device 2 is used as a display device. In this embodiment, the same components as those in the first embodiments have the same reference numerals.

The light-emitting device 2 includes a plurality of data lines 60, a plurality of scanning lines 70, and a plurality of pixel circuits 50 that are arranged in a matrix so as to correspond to intersections of the data lines 60 and the scanning lines 70.

A scanning line driving circuit 10 sequentially selects the plurality of scanning lines 70. When a driving signal is supplied through the data line 60 in a period in which a certain scanning line 70 is selected, the driving signal is written to the pixel circuits 50 connected to the selected scanning line 70. Driving signal output circuits 30-1 to 30-*n* output the driving signals to the data lines 60 at the time when write signals WT1 to WTn output from a waveform forming circuit 25 are designated. The write signals WT1 to WTn change to high levels in synchronization with the timings defined by control signals LT1 to LTn generated by the waveform forming circuit 25.

Figure 15:
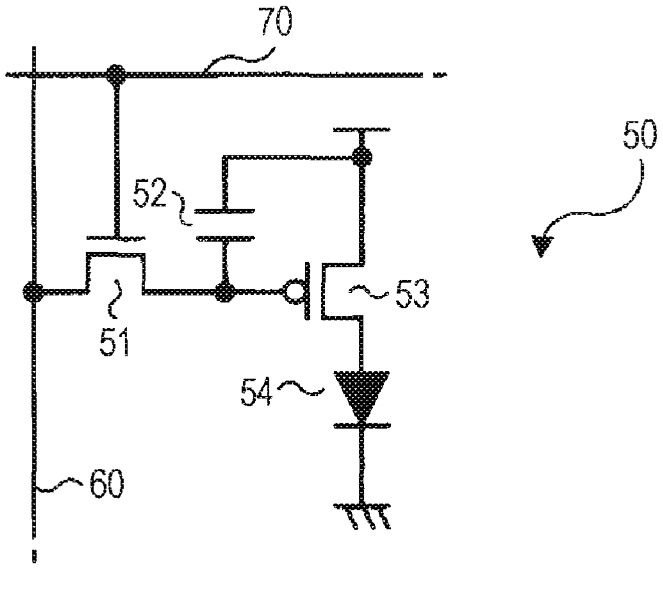
FIG. 15 is a circuit diagram illustrating a pixel circuit used in the light-emitting device.

FIG. 15 is a diagram illustrating the structure of one pixel circuit 50. The pixel circuit 50 includes a transistor 51, a driving transistor 53, an OLED 54, and a capacitor 52 is connected between the gate and the source of the driving transistor 53. The OLED 54 is turned on or off by the gate potential of the driving transistor 53. The capacitor 52 serves as an element for storing the gate potential. When the scanning signal supplied through the scanning line 70 is activated (turns to a high level), the transistor 51 is turned on to write the signal supplied through the data line 60 to the capacitor 52.

Figure 16:
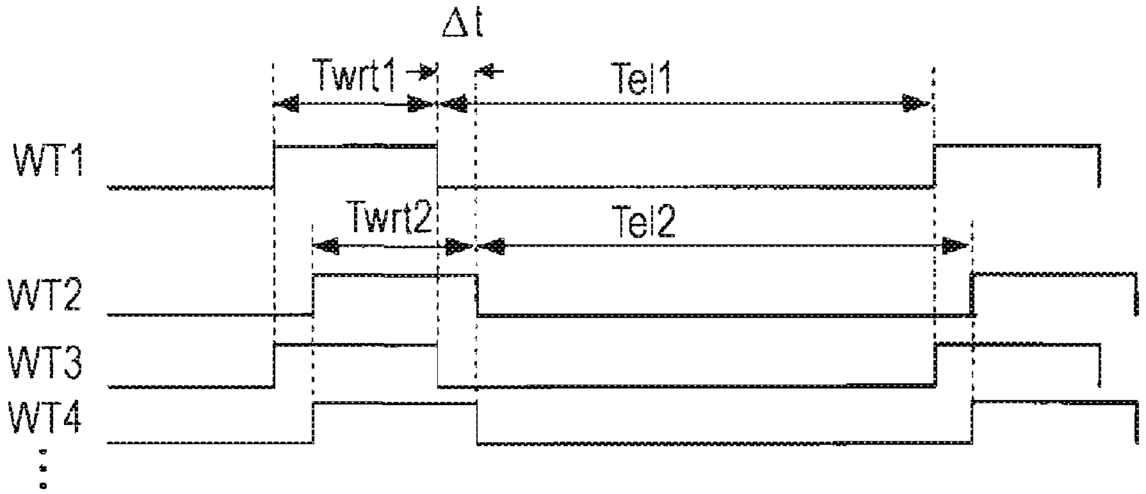
FIG. 16 is a timing chart illustrating control signals.

FIG. 16 is a timing chart illustrating control signals. As shown in FIG. 16, even-numbered control signals WT2, WT4, . . . , WT2*n* (n is a natural number) are delayed from odd-numbered control signals WT1, WT3, . . . , W2*n*−1 by ΔT and then activated. Therefore, odd-numbered blocks B1, B3, . . . , B2*n*−1 write the driving signals in a first write period Twrt1 so that each of the OLEDs 54 emits light with a brightness corresponding to the corresponding driving signal in a first emission period Tel1. Meanwhile, even-numbered blocks B2, B4, . . . , B2 write the driving signals in a second write period Twrt2 so that each of the OLEDs 54 emits light with a brightness corresponding to the corresponding driving signal in a second emission period Tel2.

When the driving signal is written to the pixel circuit 50, a large amount of current flows through the pixel circuit 50. However, as in this embodiment, the deviation between write timings enables noise to be temporally dispersed, which makes it possible to prevent an erroneous operation of the display device.

Image Forming Apparatus

As shown in FIG. 1, the optical head 1 according to the first or second embodiment can be used as a linear optical head for writing a latent image on an image carrier of an electrophotographic image forming apparatus. For example, the image forming apparatus may be used as a printer, a printing unit of a copy machine, or a printing unit of a facsimile.

Figure 17:
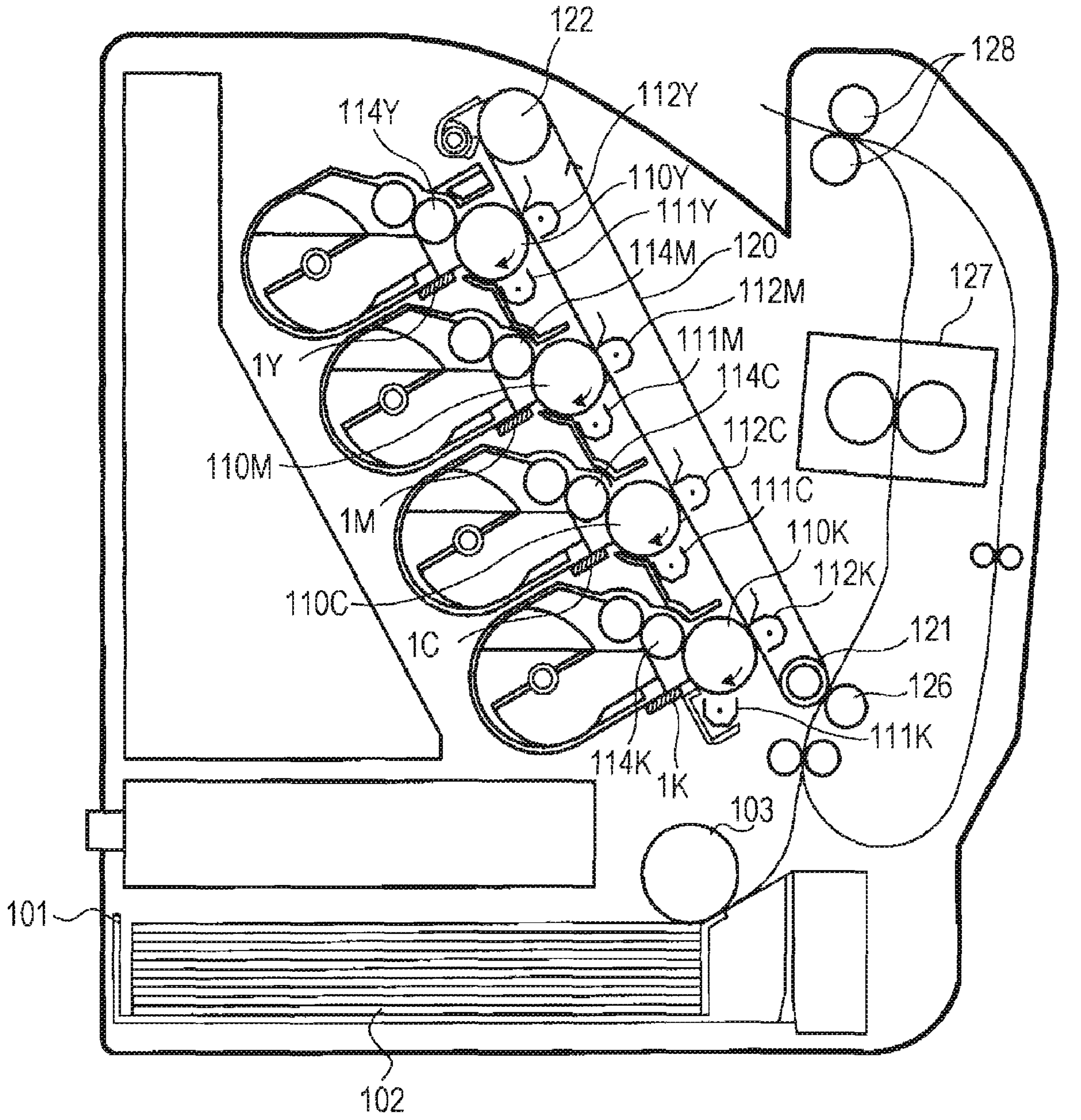
FIG. 17 is a longitudinal sectional view illustrating the structure of an image forming apparatus using the optical head according to the embodiment of the invention.

FIG. 17 is a longitudinal cross-sectional view illustrating an example of the image forming apparatus using the optical head 1. The image forming apparatus 1 is a tandem full color image forming apparatus using an intermediate transfer method.

In the image forming apparatus, four organic electro-luminescent (EL) array exposure heads 1K, 1C, 1M, and 1Y having the same configuration are arranged at exposure positions of four corresponding photorecepter drums (image carriers) 110K, 110*c*, 110M, and 110Y having the same configuration. The organic EL array exposure heads 1K, 1C, 1M, and 1Y correspond to the optical head 1 according to any one of the above-described embodiments.

As shown in FIG. 17, the image forming apparatus is provided with a driving roller 121, a driven roller 122, and an endless intermediate transfer belt 120 wound around the rollers 121 and 122 so as to rotate around the rollers 121 and 122 in a direction indicated by an arrow. Although not shown in FIG. 17, the image forming apparatus may be provided with a tension applying member, such as a tension roller, that applies tension to the intermediate transfer belt 120.

The four photorecepter drums 110K, 110C, 110M, and 110Y each having a photosensitive layer on its outer peripheral surface are arranged at predetermined intervals from each other around the intermediate transfer belt 120. The suffixes K, C, M and Y mean black, cyan, magenta, and yellow used for forming corresponding toner images, respectively. This is similarly applied to other members. The photorecepter drums 110K, 110C, 110M, and 110Y are driven to rotate in synchronization with the driving of the intermediate transfer belt 120.

A corona charging unit 111 (K, C, M, and Y), the organic EL array exposure head 1 (K, C, M, and Y), and a developing device 114 (K, C, M, and Y) are arranged around each photorecepter drum 110 (K, C, M, and Y). The corona charging device 111 (K, C, H, and Y) uniformly charges the outer peripheral surface of the corresponding photorecepter drum 110 (K, C, M, and Y). The organic EL array exposure head 1 (K, C, M, and Y) writes an electrostatic latent image on the charged outer peripheral surface of the photorecepter drum. Each of the organic EL array exposure heads 1 (K, C, M, and Y) is arranged such that a plurality of OLEDs P are aligned along the generatrix (main scanning direction) of each of the photorecepter drums 110 (K, C, M, and Y). The writing of an electrostatic latent image is performed by radiating light emitted from a plurality of light-emitting elements 30 to the photorecepter drums. The developing device 114 (K, C, M, and Y) deposits toner, serving as a developing agent, on the electrostatic latent image to form a toner image, that is, a visible image on the corresponding photorecepter drum.

The black, cyan, magenta, and yellow toner images formed by the four monochromatic imaging systems are primarily transferred sequentially onto the intermediate transfer belt 120 so as to be superposed onto one another on the intermediate transfer belt 120. As a result, a full-color toner image is obtained. Four primary transfer corotrons (transferring device) 112 (K, C, M, and Y) are arranged inside the intermediate transfer belt 120. The primary transfer corotrons 112 (K, C, M, and Y) are arranged in the vicinities of the photorecepter drums 110 (K, C, M, and Y), respectively, and electrostatically attract the toner images from the photorecepter drums 110 (K, C, M, and Y) to transfer the toner images onto the intermediate transfer belt 120 passing between the photorecepter drums and the primary transfer corotrons.

Sheets 102, serving as targets on which images are to be finally formed are fed one by one from a paper feeding cassette 101 by a pickup roller 103, and are then sent to a nip between the intermediate transfer belt 120 abutting on the driving roller 121 and a secondary transfer roller 126. The full-color toner images on the intermediate transfer belt 120 are secondarily transferred collectively onto one side of the sheet 102 by the secondary transfer roller 126, and then the transferred image passes between a pair of fuser rollers 127, serving as a fuser, to be fixed on the sheet 102. Thereafter, the sheet 102 is ejected to a paper ejecting cassette that is formed on the top of the mage forming apparatus by a pair of paper ejecting rollers 128.

Next, another embodiment of the image for timing apparatus according to the invention will be described.

Figure 18:
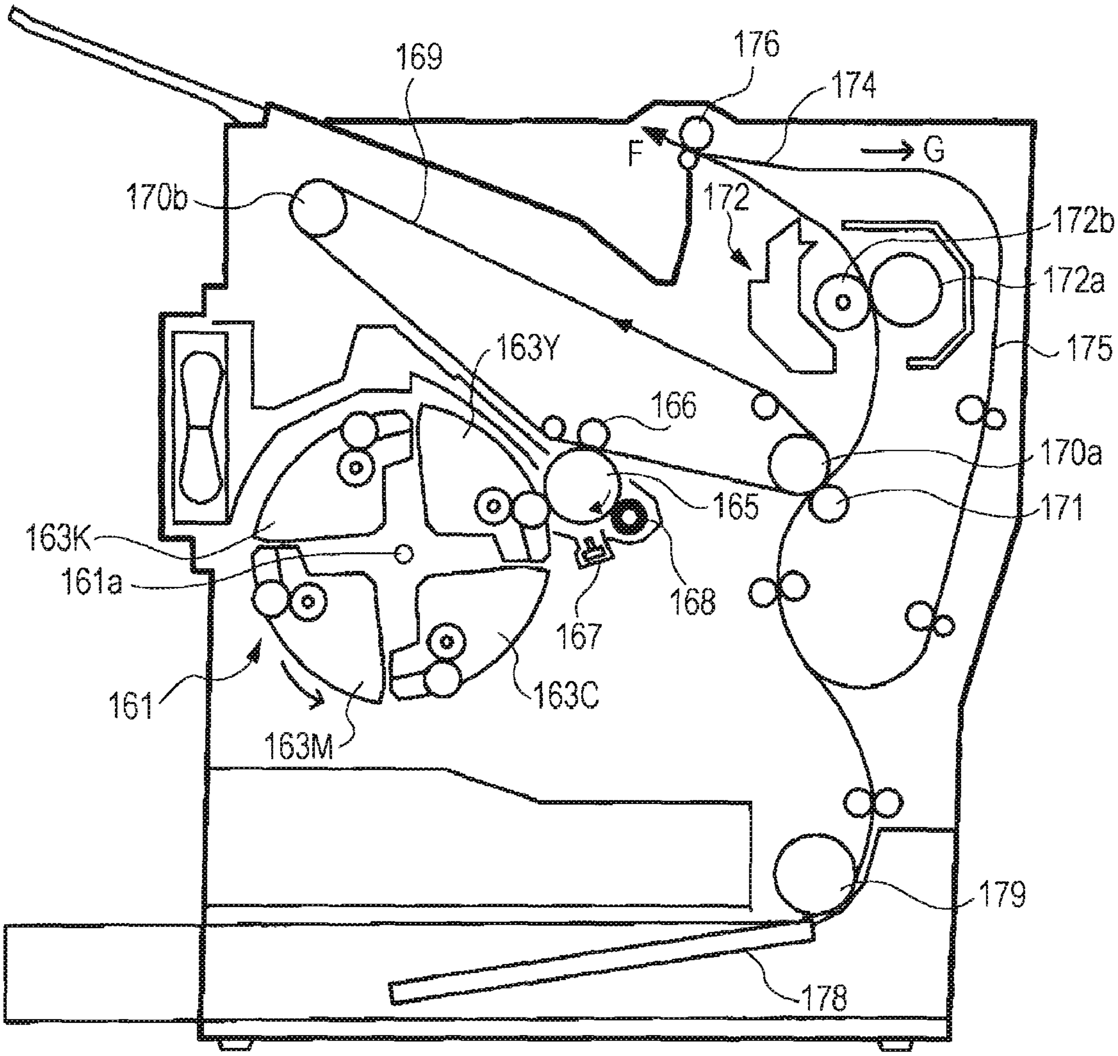
FIG. 18 is a longitudinal sectional view illustrating the structure of another image forming apparatus using the optical head according to the embodiment of the invention.

FIG. 18 is a longitudinal sectional view showing another image forming apparatus using the optical head 1. The image forming apparatus is a rotary-development-type full-color image forming apparatus using a belt intermediate transfer method. In the image forming apparatus shown in FIG. 18, a corona charging device 168, a rotary developing unit 106, an organic EL array exposure head 167, and an intermediate transfer belt 169 are provided around a photorecepter drum 165.

The corona charging device 168 uniformly charges the outer peripheral surface of the photorecepter drum 165. The organic EL array exposure head 167 writes an electrostatic latent image on the charged outer peripheral surface of the photosensitive drum 165. The organic EL array exposure head 167, which is the optical head 1 according to any one of the above-described embodiment, is arranged such that a plurality of light-emitting elements 30 are aligned along the generatrix (main scanning direction) of the photorecepter drum 165. The writing of an electrostatic latent image is performed by radiating light emitted from the plurality of light-emitting elements 30 to the photorecepter drum 165.

The developing unit 161 is a drum having four developing devices 163Y, 163C, 163M, and 163K arranged at angular intervals of 90°, and is rotatable around a shaft 161*a* in the counterclockwise direction. The developing devices 163Y, 163C, 163M, and 163K respectively supply yellow, cyan, magenta, and black toners to the photorecepter drum 165 to deposit the toners as developing agents on an electrostatic latent image, thereby forming a toner image, i.e., a visible image on the photosensitive drum 165.

An endless intermediate transfer belt 169 is wound around a driving roller 170*a*, a driven roller 170*b*, a primary transfer roller 166, and a tension roller, and rotates around these rollers in the direction represented by arrow. The primary transfer roller 166 electrostatically attracts the toner image from the photorecepter drum 165 and transfers the toner image to the intermediate transfer belt 169 passing between this photorecepter drum and the primary transfer roller 166.

More specifically, during the first one turn of the photorecepter drum 165, an electrostatic latent image for a yellow (Y) image is written by the exposure head 167, a toner image having the same color is formed by the developing device 163Y, and the toner image is then transferred onto the intermediate transfer belt 169. During the next turn of the photorecepter drum 165, an electrostatic latent image for a cyan (C) image is written by the exposure head 167, a toner image having the same color is formed by the developing device 163C, and the toner image is then transferred onto the intermediate transfer belt 169 so as to be superposed on the yellow toner image. As the photorecepter drum 165 makes four turns in this way, yellow, cyan, magenta, and black toner images are sequentially superposed on the intermediate transfer belt 169. As a result, a full-color toner image is formed on the intermediate transfer belt 169. When images are formed on both sides of a sheet on which the images are to be finally formed, a full-color toner image is formed on the intermediate transfer belt 169 in such a manner that toner images having the same color are transferred onto the front and rear surfaces of the intermediate transfer belt 169, and then toner images having the next same color are transferred onto the front and rear surfaces of the intermediate transfer belt 169.

A sheet handling 174 is provided in the image forming apparatus to allow a sheet to pass therethrough. Sheets are picked up one by one by a pickup roller 179 from a paper feeding cassette 178, are transported by a transport roller along the sheet handling 174, and passes through a nip between the intermediate transfer belt 169 abutting on the driving roller 170*a* and the secondary transfer roller 171. The secondary transfer roller 171 electrostatically attracts a full-color toner image collectively from the intermediate transfer belt 169 to transfer the toner image onto one surface of the sheet. The secondary transfer roller 171 is configured to approach and be separated from the intermediate transfer belt 169 by a clutch not shown). When a full-color toner image is transferred onto a sheet, the secondary transfer roller 171 is brought into contact with the intermediate transfer belt 169. When toner images are superposed on the intermediate transfer belt 169, the secondary transfer roller 171 is separated from the intermediate transfer belt 169.

The sheet having the toner image transferred thereonto in this manner is transported to the fuser 172, and then passes between a heat roller 172*a* and a pressure roller 172*b* of the fuser 172, so that the toner image is fixed to the sheet. The sheet after the fusing process passes through a pair of paper ejecting rollers 176 to be transported in a direction indicated by an arrow F. In the case of double-sided printing, after most of the sheet has passed between the pair of paper ejecting rollers 176, the pair of paper ejecting rollers 176 are rotated in a reverse direction so that the sheet is introduced into a handling 175 for double-sided printing, as indicated by an arrow G. Then, the toner image is transferred onto the other surface of the sheet by the secondary transfer roller 171, and the fuser 172 performs the fusing process on the toner image again. Then, the sheet is ejected by the pair of paper ejecting rollers 176.

Since each of the image forming apparatuses shown in FIGS. 17 and 18 uses the OLEDs P as the exposure units, it is possible to further reduce the size of the image forming apparatus, as compared to an image forming apparatus using a laser scanning optical system. In addition, the optical head according to the above-described embodiments of the invention can also be applied to other electrophotographic image forming apparatuses, such as an image forming apparatus that directly transfers a toner image onto a sheet from a photorecepter drum without using an intermediate transfer belt and an image forming apparatus that forms a monochromatic image.

Further, the optical head according to the above-described embodiments of the invention can be applied to various types of electronic apparatuses, such as a facsimile, a copy machine, a multifunction apparatus, and a printer.

The entire disclosure of Japanese Patent Application No. 2006-060567, filed Mar. 7, 2006 is expressly incorporated by reference herein.

What is claimed is:

1. A light-emitting device comprising:

a plurality of light-emitting elements that emit light in response to driving signals, a control unit that adjusts the timings at which the driving signals are supplied to a plurality of blocks, each block being composed of two or more light-emitting elements, each light-emitting element directly connected to a driving unit, wherein the control unit generates control signals for indicating the timings at which the driving signals are supplied for every block; and a plurality of driving units that are provided for the blocks and supply the driving signals to the light-emitting elements belonging to the corresponding blocks on the basis of the control signals, wherein the light-emitting elements composing a block simultaneously emit light at a first time, and do not emit light at a second time, wherein the control unit classifies the blocks into a plurality of groups, each group supplying the driving signals at the same timing, generates the control signals to be supplied to the plurality of groups at different timings, and regroups the blocks in response to a setting signal, wherein the control unit generates a single control signal for each driving unit, and wherein the setting signal designates a printing quality, and the control unit regroups the blocks such that the number of blocks belonging to each of the groups increases as the printing quality designated by the setting signal increases, thereby reducing the number of groups.

2. The light-emitting device according to claim 1, further comprising:

a storage unit that stores the setting signal, wherein the control unit reads out the setting signal from the storage unit to regroup the blocks.

3. The light-emitting device according to claim 1, wherein the control unit includes:

a reference signal generating unit that generates a reference signal; and a control signal generating unit that detects the reference signal to start counting a clock signal and generates the control signals according to the counting result.

4. The light-emitting device according to claim 1, wherein the control unit assigns the blocks to a plurality of groups such that a relative delay and advance of the timings at which the driving signals are supplied to adjacent groups are repeated in a predetermined cycle.

5. The light-emitting device according to claim 4, wherein the control unit assigns the blocks to the plurality of groups such that a deviation between the timings at which the driving signals are supplied to adjacent groups is constant.

6. An electronic apparatus comprising the light-emitting device according to claim 1.

7. The light-emitting device according to claim 1, wherein the light-emitting elements constituting a block turn on and off according to the timings.

8. The light-emitting device according to claim 1, wherein the timings are durations of time between a time at which a first block turns on or off and a time at which a second block turns on or off.

9. A method of driving a plurality of light-emitting elements in response to driving signals, comprising:

adjusting timings at which the driving signals are supplied to a plurality of blocks, each block composed of two or more light-emitting elements, each light emitting element directly connected to a driving unit, wherein a control unit generates control signals for indicating the timings at which the driving signals are supplied for every block such that a single control signal is supplied for each driving unit;

supplying the driving signals to the light-emitting elements belonging to the corresponding blocks on the basis of the control signals generated for every block; and the light-emitting elements composing a block simultaneously emit light at a first time, and do not emit light at a second time, wherein the generating of the control signals includes:

the control unit classifying the blocks into a plurality of groups, each group supplying the driving signals at the same timing;

generating the control signals to be supplied to the plurality of groups at different timings; and regrouping the blocks according to a setting signal, wherein the setting signal designates a printing quality, and the control unit regroups the blocks such that the number of blocks belonging to each of the groups increases as the printing quality designated by the setting signal increases, thereby reducing the number of groups.

10. The driving method according to claim 9, wherein the light-emitting elements constituting a block turn on and off according to the timings.

11. The driving method according to claim 9, wherein the timings are durations of time between a time at which a first block turns on or off and a time at which a second block turns on or off.

12. A light-emitting device comprising:

a plurality of light-emitting elements;

a plurality of driving units that supply the driving signals to the light-emitting elements, each driving unit being directly connected to two or more light-emitting elements;

a control unit that supplies a plurality of control signals to a plurality of driving units, the control signal controls when the driving units supply the driving signal to the light-emitting elements, wherein the light emitting elements composing a block simultaneously emit light at a first time, and do not emit light at a second time, wherein the control unit classifies the blocks into a plurality of groups, each group supplying the driving signals at the same timing, generates the control signals to be supplied to the plurality of groups at different timings, and regroups the blocks in response to a setting signal, wherein the control unit generates a single control signal for each driving unit; and wherein the setting signal designates a printing quality, and the control unit regroups the blocks such that the number of blocks belonging to each of the groups increases as the printing quality designated by the setting signal increases, thereby reducing the number of groups.

* * * * *